(12) United States Patent
Azevedo

(10) Patent No.: US 6,382,578 B2
(45) Date of Patent: May 7, 2002

(54) DETACHABLE ANIMAL FEEDING BOWL SUPPORT DEVICE

(76) Inventor: Daniel Azevedo, 832 Birch, Los Banos, CA (US) 93635

( * ) Notice: Subject to any disclaimer, the term of this patent is extended or adjusted under 35 U.S.C. 154(b) by 0 days.

(21) Appl. No.: 09/820,015

(22) Filed: Mar. 28, 2001

Related U.S. Application Data
(60) Provisional application No. 60/193,505, filed on Mar. 30, 2000.

(51) Int. Cl.[7] ................................................. A47K 5/00
(52) U.S. Cl. ...................................... 248/310; 119/51.5
(58) Field of Search ................................ 248/310, 312, 248/314, 309.1, 315, 312.1; 119/61, 51.5

(56) References Cited

U.S. PATENT DOCUMENTS

| | | | | |
|---|---|---|---|---|
| 546,706 A | * | 9/1895 | McConnell | 220/481 |
| 1,873,297 A | * | 8/1932 | Davenport | 248/312.1 |
| 1,879,332 A | * | 9/1932 | Kulp | 119/61 |
| 2,514,491 A | * | 7/1950 | Hay et al. | 119/18 |
| 2,599,844 A | * | 6/1952 | Kounkel | 119/61 |
| 2,793,616 A | * | 5/1957 | Warner | 119/61 |
| 4,011,951 A | | 3/1977 | Boyer | 211/71 |
| 5,000,124 A | * | 3/1991 | Bergen | 119/63 |
| 5,195,461 A | | 3/1993 | Brown | 119/61 |
| 5,429,071 A | | 7/1995 | Altman | 119/61 |
| 5,713,305 A | | 2/1998 | Hollaway et al. | 119/464 |

FOREIGN PATENT DOCUMENTS

GB          2 035 003 A     * 6/1980     ............ A01K/5/00

* cited by examiner

*Primary Examiner*—Leslie A. Braun
*Assistant Examiner*—Kofi Schulterbrandt
(74) *Attorney, Agent, or Firm*—Mark D. Miller

(57) ABSTRACT

Disclosed is a detachable apparatus for securely holding an animal feeding bowl against a wall or fence. The apparatus may be mounted to either the mesh of an animal cage or onto a pair of appropriate supports on a wall, post or other surface. A circular peripheral support is provided for holding the feeding bowl. A pair of slidable locking members are provided in a sleeve in the device, one for detachably engaging the device with openings in the mesh of a fence or with a pair of wall supports, and the other for locking the feeding bowl in place. The removable apparatus of the present invention securely holds the feeding bowl in place so that it is not dislodged or spilled by a large animal.

5 Claims, 3 Drawing Sheets

DETACHABLE ANIMAL FEEDING BOWL SUPPORT DEVICE

This application claims the benefit of provisional application No. 60/193,505 filed Mar. 30, 2000.

BACKGROUND OF THE INVENTION

1. Field of The Invention

The present invention is an apparatus for securely holding the feeding bowl of a dog or other animal securely in place, the apparatus being mountable on a wall or a post, or on the wires or mesh of a cage such as a chain link fence.

2. Description of the Prior Art

Dogs and other animals are frequently kept in kennels or stalls for care, safety, training, recuperation and/or supervision. Such stalls or cages usually have at least one wall made of wire or mesh such as a chain link or chicken wire fence. The feeding of such caged animals has always posed a problem from the spilling of food. This problem is especially prevalent with large and aggressive animals such as dogs that are prone to tip or topple their feeding bowls as they eat. Aside from increased time and labor for cleanup, spilled food which accumulates in a cage may pose a health problem to the animal by attracting pests and providing a breeding ground for disease. It is therefore of great importance to reduce the occasions of spilled food or water in an animal cage.

Several animal feeder support devices have been developed such as the bracket of U.S. Pat. No. 4,011,951. However, the bracket of this invention is designed to be mounted on a horizontal wooden board, and the feeding bowl may be easily dislodged from the bracket. Similarly, the invention of U.S. Pat. No. 5,713,305 does not prevent dislodgement of the feeding bowl. The invention of U.S. Pat. No. 5,195,461 describes a cumbersome and bulky structure including support struts that requires a hole to be cut in the chain link fence to receive a support frame. The invention of U.S. Pat. No. 5,429,071 describes a free standing feeder with self contained moat to prevent insects form accessing the animal feed; however, this invention could easily be toppled by a large animal thereby allowing for easy spillage of the feed and water. None of the prior art feeder holders provide a simple, detachable support structure that is capable of securely holding the animal feeding bowl in place to prevent dislodgement by a large animal.

SUMMARY OF THE INVENTION

The present invention overcomes the drawbacks of the prior art by providing a detachable apparatus for securely holding an animal feeding bowl that is capable of being securely be mounted to either the mesh of the animal cage or on appropriate support hooks on a wall, post or other surface. The invention includes a circular peripheral support member for holding an animal feeding bowl. The circular support member is attached to a vertical bar that extends above and below the circular support member. The lower section of the vertical bar includes an inwardly bent flange for engagement with an opening in the fence, or with a support member (e.g. a hook or eyelet) mounted on a surface. The upper section of the vertical bar terminates in a sleeve through which two other slidable members are provided. The first of these slidable members is adjacent to the circular support member and used to hold the feeding bowl in place. The second slidable member is positioned between the first slidable member and the vertical bar and is used to engage the entire apparatus to a wall or fence.

The first slidable member includes a bend defining a lower section that slides into the animal feed bowl, holding the bowl securely in place against the circular support member. The upper end of the first slidable member includes an inwardly bent flange that may be grasped to slide the first slidable member up and down in the sleeve. Sliding this member down engages the animal bowl; sliding this member up releases the bowl for removal, cleaning and refilling.

The second slidable member includes an outwardly bent hook structure at the top, and an inwardly bent flange at the bottom. The second slidable member works in conjunction with the lower portion of the fixed vertical bar for engagement with a fence or support devices. To attach the apparatus to a fence or wall supports, the flange in the lower section of the vertical bar is engaged with the fence or a support member on the wall. The apparatus is then raised to a vertical position, and the hook of the second slidable member is brought down, engaging another area of the fence or another support member on the wall. A bowl is placed on the circular support member, and the first slidable member is brought down so that it engages the bowl, thereby holding it firmly in place.

The bowl may be released by pulling the first slidable member in an upward direction, and the entire apparatus may be released from the fence or wall by pulling the second slidable member in an upward direction and disengaging the lower flange.

It is therefore a primary object of the present invention to provide a convenient animal feed or water bowl support structure that may be securely but detachably attached to the mesh of an animal cage, the structure also being capable of firmly holding the feed bowl in place.

It is a further object of the present invention to provide a detachable animal feed or water bowl holder for secure but detachable engagement with a pair of surface-mounted supports (e.g. hooks or eyelets) located on a flat surface (e.g. a wall or a post), the holder being capable of firmly holding the feed bowl in place.

It is another object of the present invention to provide a simple removable animal feed or water bowl holder having a circular support for receiving the feed bowl, a first slidable member for securely engaging the bowl to the holder, and a second slidable member for securely engaging the holder with the mesh of a fence or to a pair of support structures on a surface.

Additional objects of the invention will be apparent from the detailed descriptions and the claims herein.

DETAILED DESCRIPTION OF THE PREFERRED EMBODIMENT

Figure 1:
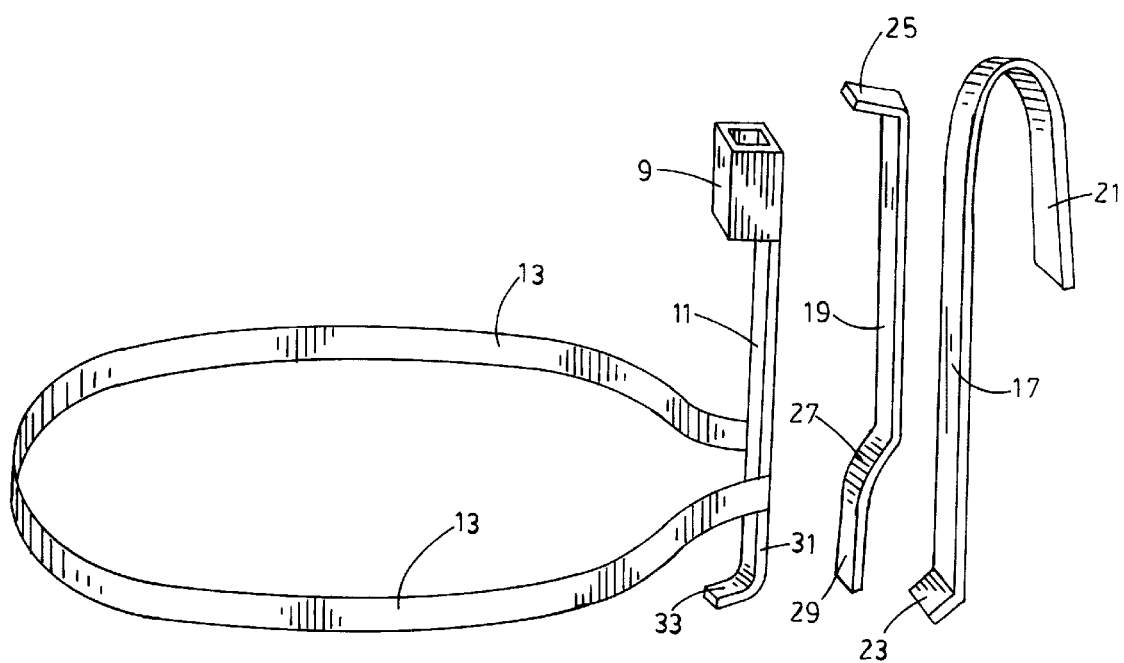
FIG. 1 is a disassembled perspective view of the invention.
Figure 2:
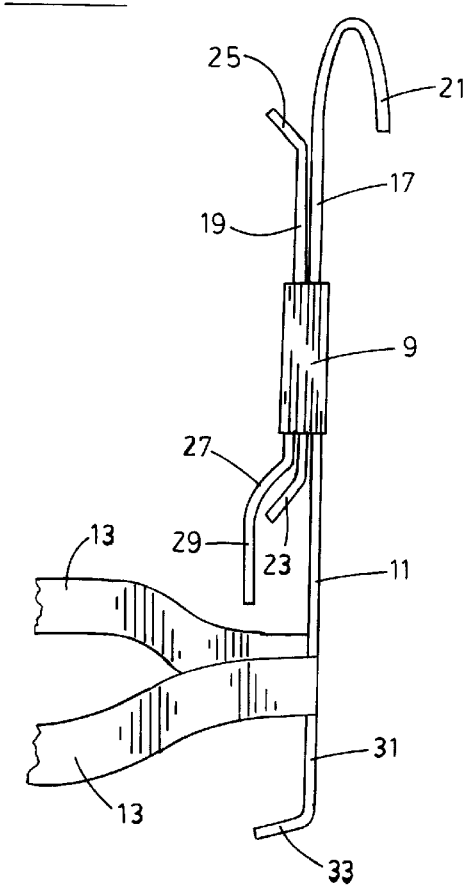
FIG. 2 is a side view of the invention showing both slidable members pulled up.
Figure 3:
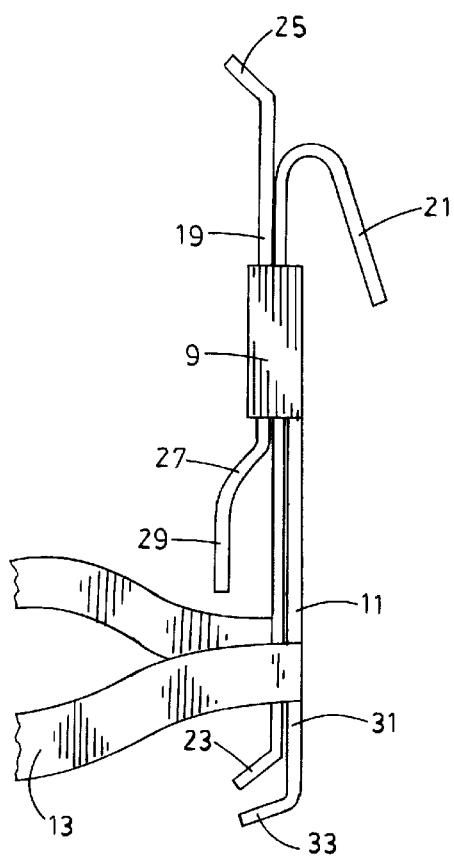
FIG. 3 is a side view of the invention showing the cage engagement member moved down, and the bowl locking member moved up.
Figure 4:
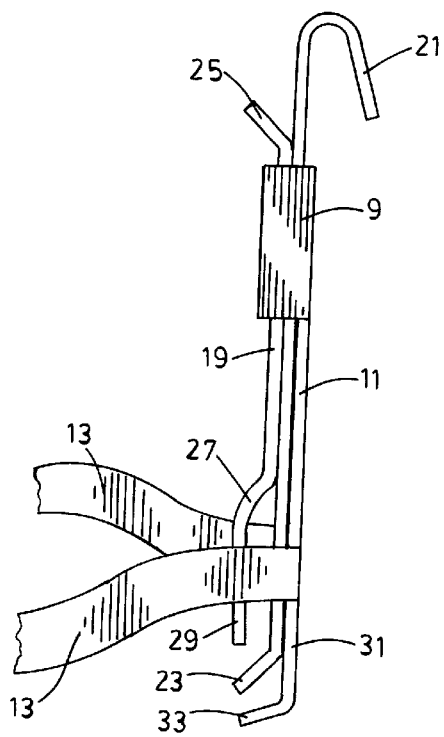
FIG. 4 is a side view of the invention showing the cage engagement member moved down, and the bowl locking member moved down.

Referring to the drawings wherein like reference characters designate like or corresponding parts throughout the several views, and referring particularly to FIGS. 1 and 2 it is seen that the invention includes fixed bar 11 having a hollow vertically-oriented sleeve 9 attached at the upper end. A large horizontally-oriented peripheral support member 13 is attached at the lower end of bar 11 for holding a feeding bowl 15 or tray. Bar 11 also includes a fixed lower extension 31 that is provided below the attachment to support member 13. Extension 31 includes an inwardly bent flange 33 used for engagement with a fence or with a support structure on a flat surface.

In the most common embodiment, the large support member 13 will be in the form of a large open circle that receives and supports a feeding or water bowl. However, the support member may have any appropriate shape to conform to the shape of the feeding bowl or tray including oval, square, rectangular, hexagonal, etc. Similarly, since feeding bowls and trays may come in a variety of different sizes (e.g. 1 qt., 2 qt., 3 qt., etc.) the support member may be provided in any of a variety of different sizes to accommodate differently sized bowls and trays. In many cases, the feeding/watering bowl or tray will have a peripheral lip around its open edge. In these cases, the peripheral support member may be sized such that the lip of the feeding bowl fits neatly over the support member. For other feeding/watering bowls and trays which do not include any peripheral lip, the diameter or perimeter of the support member should be slightly smaller than that of the bowl or tray in order to provide support.

Figure 5:
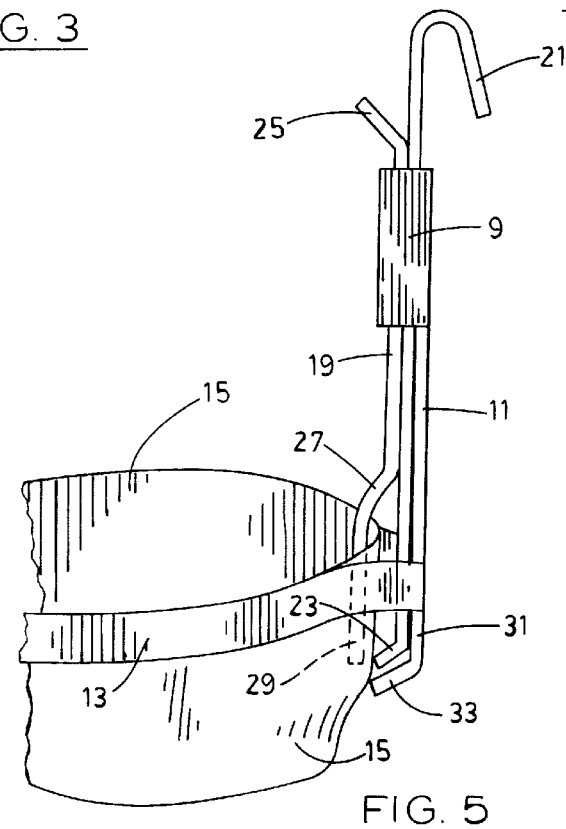
FIG. 5 is a side view of the invention holding a bowl showing the cage engagement member moved down, and the bowl locking member moved down into the bowl.

Two different slidable members 17 and 19 are provided in the vertically-oriented sleeve 9. The second slidable member 17 is used to securely engage the apparatus against the wall or fence for support. This support may be either the wire mesh or chain link fence found on the wall of the animal cage, or a pair of hooks or eyelets 39 mounted on an appropriate surface such as a wall or post 40 (see FIG. 6). The first slidable member 19 is used to lock the feeding bowl 15 into place after it has been placed on the peripheral support member 13 of the present invention (see FIG. 5). The wall support engagement member 17 is slidably placed in the sleeve 9 adjacent to spacing bar 11, but separated from support member 13 by bowl locking member 19. Bowl locking member 19 is slidably placed in the sleeve 9 next to the cage engagement member 17 adjacent to the support member 13. The top of the cage engagement member 17 is outwardly bent over itself to form a large hook 21 for attachment to the fence or wall support. The bottom of the cage engagement member includes an inwardly bent flange 23 that prevents member 17 from being pulled through sleeve 9.

Figure 6:
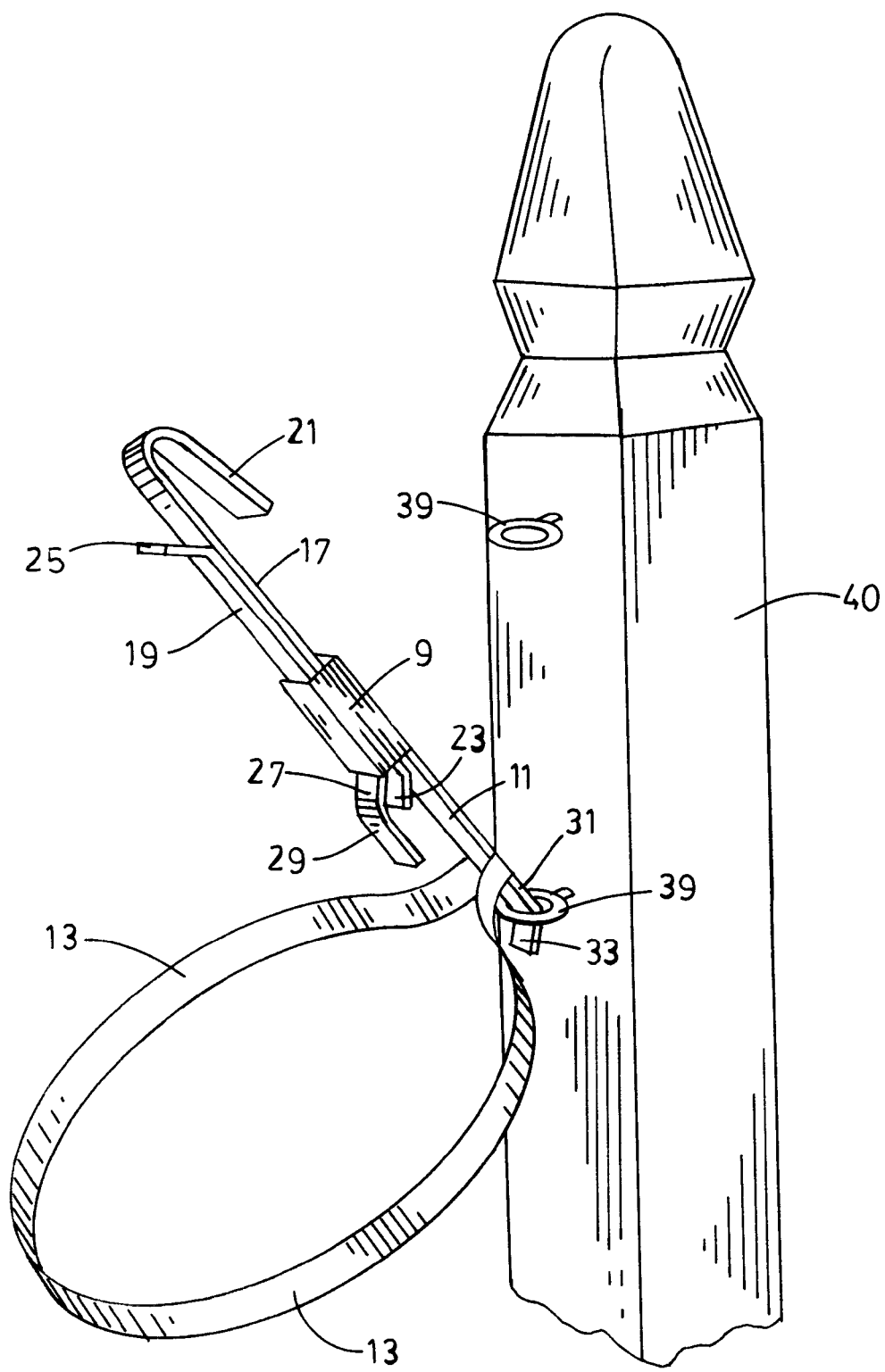
FIG. 6 is a perspective view of the present invention being attached to a pair of hooks on a support post.

To attach the present invention to the wall support, lower flange 33 of extension 31 is engaged through the wire mesh of the fence or into a lower support hook 39 (as shown in FIG. 6). Engagement member 17 is then slid up from sleeve 9 until its upper hook 21 is poised above an opening in the wire mesh of the fence or above the upper hook 39. Bottom flange 23 will stop excessive upward movement. Hook 21 is then placed over a wire or into an opening in the fence, or into an upper hook 39. Member 17 is then pulled back down through the sleeve 9 so that hook 21 securely engages the apparatus to the fence or wall support.

The locking member 19 is used not only to hold a feeding bowl or tray in place, but also to provide frictional pressure against the engagement member 17 to hold it in place. The locking member 19 includes an inwardly bent upper flange 25 at the top, and a bend 27 near the bottom that defines a lower section 29 for engagement over a bowl. To insert a feeding bowl 15, the locking member 19 is slided upward in the sleeve (using the upper flange 25 as a handle), and a feed or water bowl 15 is placed on the peripheral support member 13. The locking member 19 is then slided back down in the sleeve 9 which causes the lower section 29 to slide inside the feeding bowl 15 to hold it in place against the peripheral support 13 (see FIG. 5). This downward motion also more securely holds the cage engagement member 17 inside sleeve 9.

Flange 33 on the lower support member 31 is bent inward such that it touches the outside edge of the feeding bowl 15 when inserted into the invention. Similarly, flange 23 of engagement member 17 is also bent inwardly. When locking member 19 is brought down, these flanges 23 and 33 are directly across from the lower section 29 of locking member 19 which has been extended into the feeding bowl, allowing these flanges 23 and 33 and the lower section 29 of the locking member to pinch the bowl 15 between them (see FIG. 5) for further support. This helps prevent the animal from bumping the bowl out of the support. Bend 27 and lower section 29 of locking member 19 also help hold flange 23 of cage engagement member 17 in place, thereby more securely holding the entire apparatus to the fence or wall.

In the preferred embodiment all of the parts of the present invention are made of metal, preferably stainless steel or the like. However, these parts may be made of rigid durable plastic or wood if desired. The invention may be provided in various shapes and sizes to accommodate different bowl sizes and shapes, to accommodate different fences and cages having different opening configurations, and/or different types of surface mounted support structures such as hooks, eyelets, rings, handles, etc. or any combination thereof.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An animal feed bowl support apparatus comprising a vertically oriented bar having a hollow sleeve at its upper end, an inwardly bent flange at its lower end, and a peripheral bowl support attached between said sleeve and said flange; a first slidable member disposed in said sleeve adjacent to said bar, said first slidable member having an inwardly bent flange at the lower end thereof and an outwardly bent hook at the upper end thereof; and a second slidable member disposed in said sleeve adjacent to said first slidable member, said second slidable member having a bend therein in defining a lower section for slidable engagement with a bowl placed in said peripheral support.

2. The support apparatus of claim 1 wherein an inwardly bent flange is provided at the upper end of said second slidable member.

3. A surface mountable animal feed bowl support apparatus comprising a horizontally oriented peripheral support for holding the peripheral edge of the bowl, a vertically oriented bracket member attached to said circular support extending above and below said support, a hollow sleeve member attached to said bracket above said support, an inwardly bent flange on said bracket below said support, a first locking member slidably disposed in said sleeve immediately adjacent to said bracket, said first locking member having an upper and lower end, the upper end being bent over in an outward direction in the form of a large hook, the lower end having an inwardly bent flange, and a second locking member slidably disposed in said sleeve immediately adjacent to said first locking member, said second locking member having an upper and lower end, the lower end of said second locking member having a bend therein defining a lower section which slides into the feed bowl to secure it to the apparatus.

4. The support apparatus of claim 3 wherein an inwardly bent flange on upper end of said second locking member.

5. A method for holding an animal feed bowl comprising the steps of:

a. engaging the lower end of a straight bracket member having an inwardly bent flange thereon with a first wall support;

b. straightening said bracket member to a generally vertical position;

c. downwardly sliding a first locking member through a hollow sleeve at the upper end of said bracket member, said locking member having a large outwardly extending bend therein for engagement with a second wall support;

d. inserting the animal feed bowl into a horizontally oriented peripheral support attached to said bracket; and e. downwardly sliding a second locking member through said hollow sleeve such that a bend in the lower section thereof engages said bowl to hold it firmly in place.

\* \* \* \* \*